United States Patent Office 2,839,833
Patented June 24, 1958

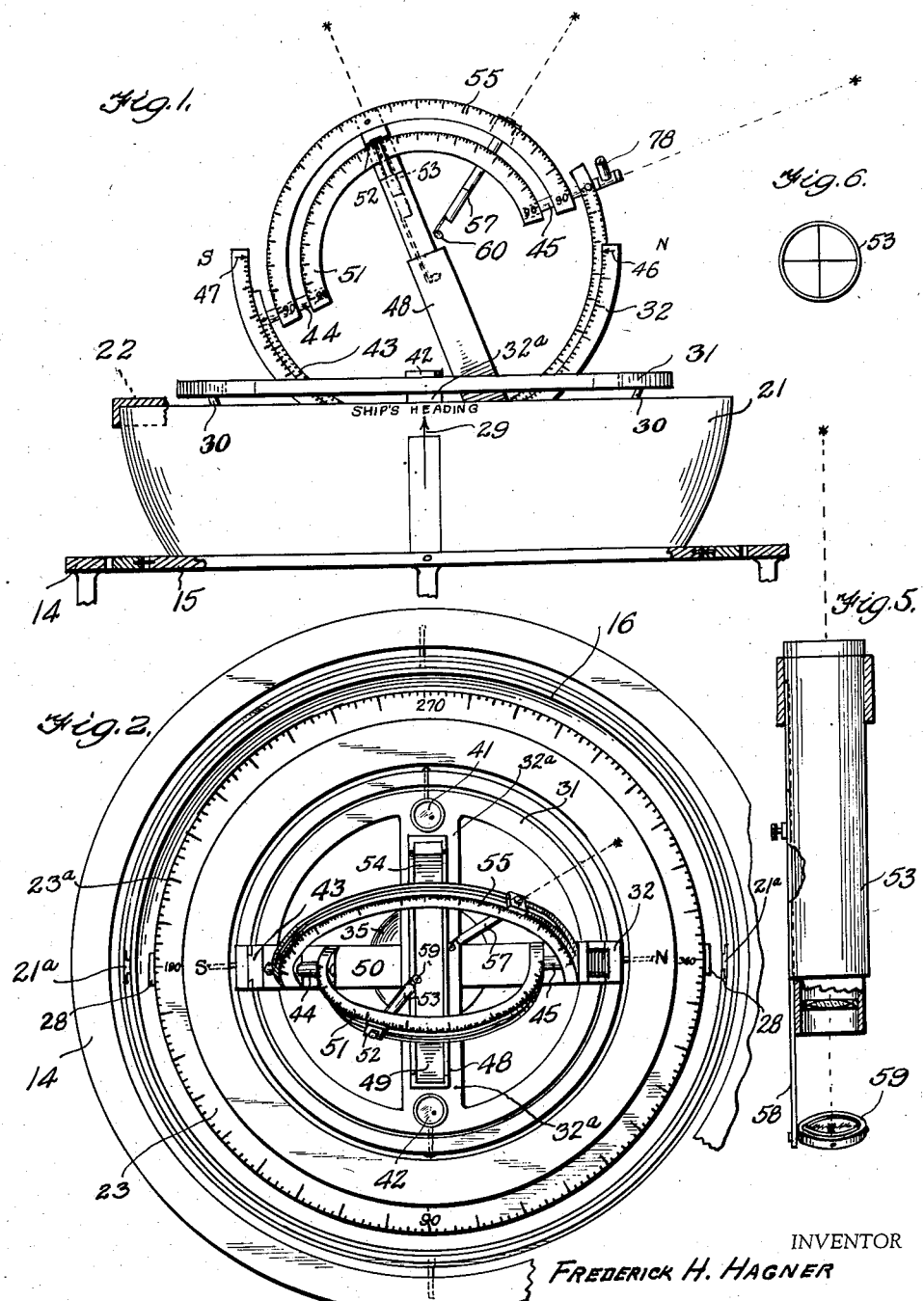

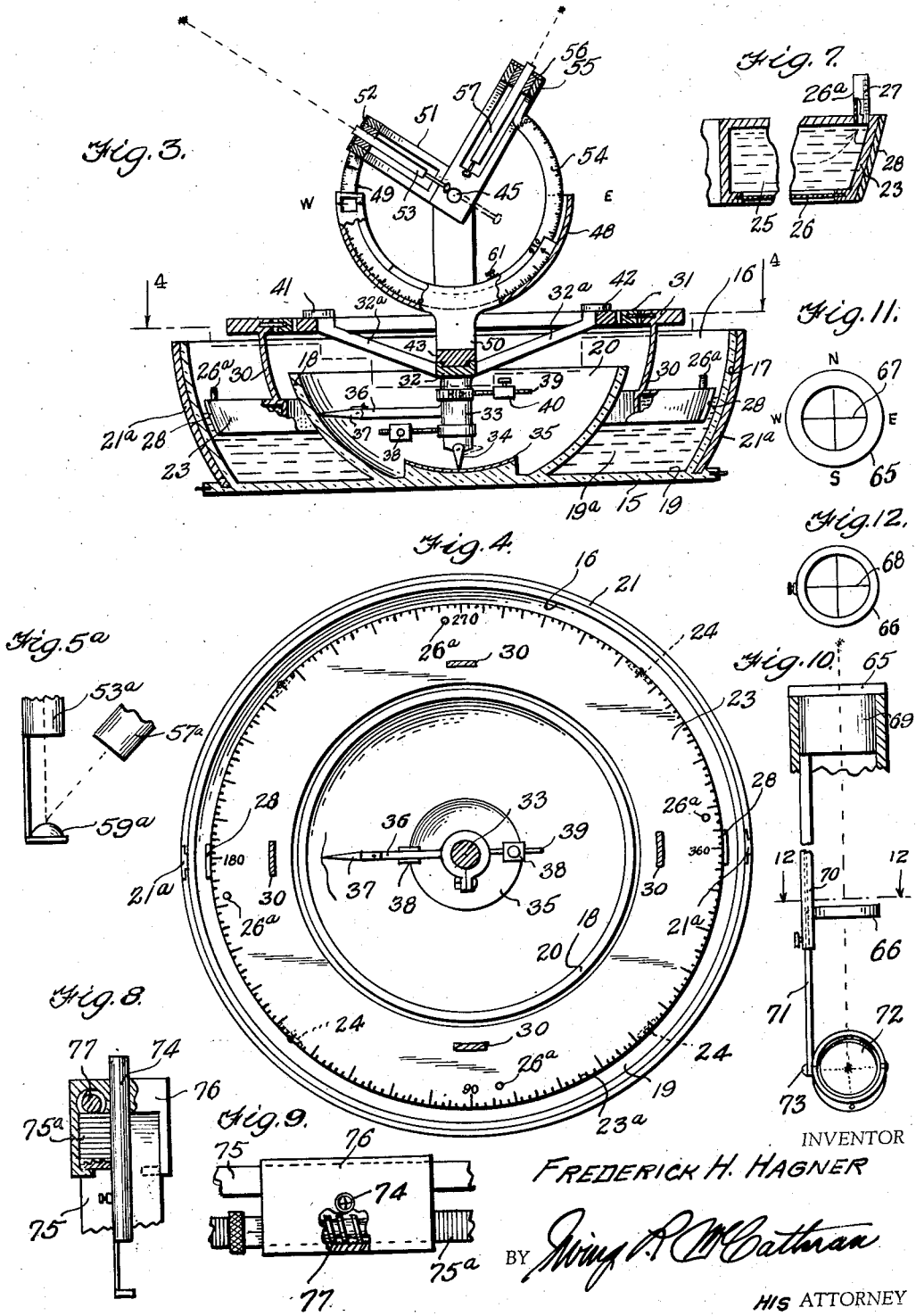

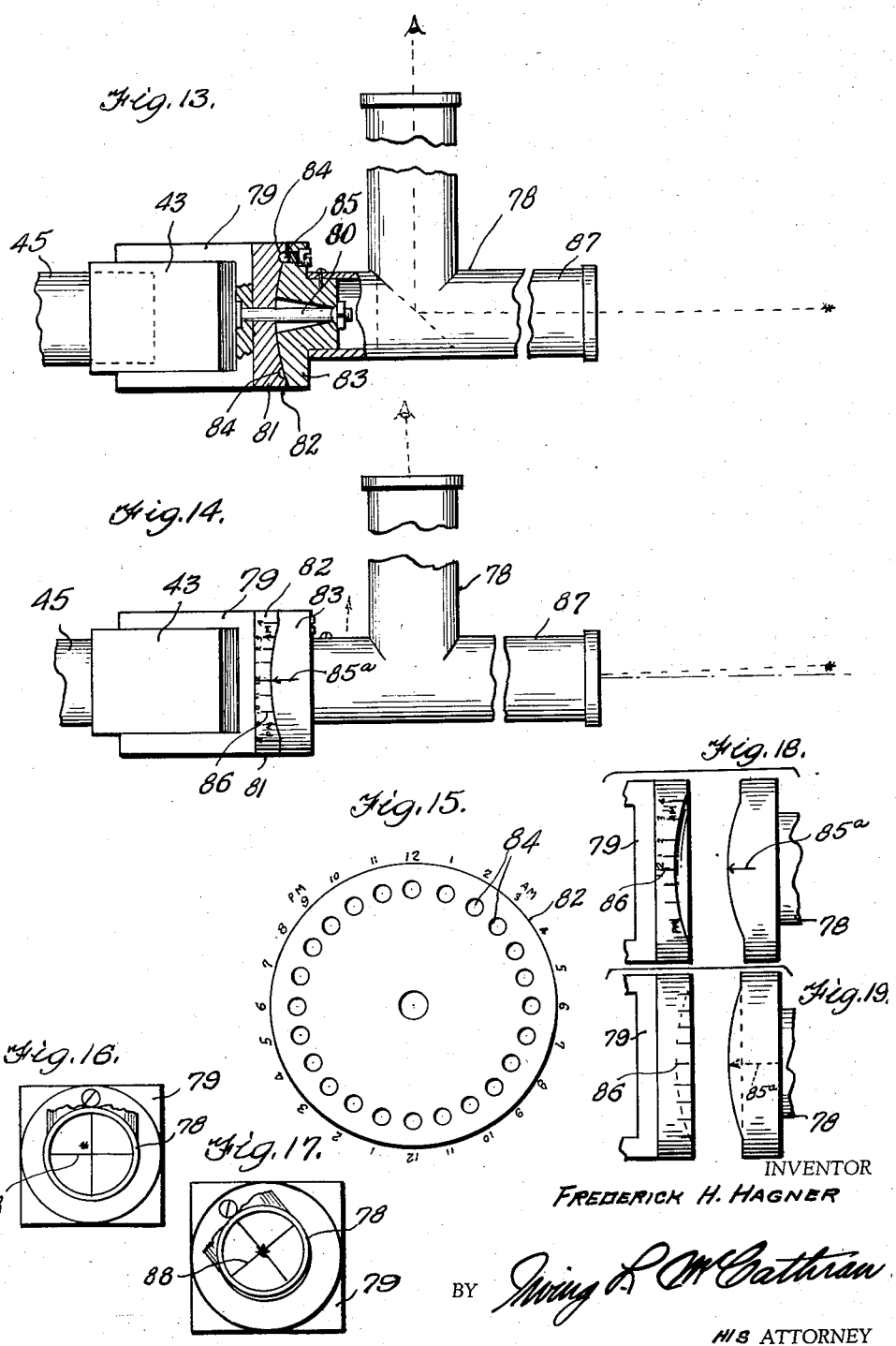

2,839,833

STABILIZED CELESTIAL NAVIGATION INSTRUMENT

Frederick H. Hagner, San Antonio, Tex.

Application March 26, 1952, Serial No. 278,598

15 Claims. (Cl. 33—61)

The object of this invention is to produce a stabilized means upon which an observing instrument or an aerial camera may be mounted so as to be free from vibration.

Another object of this invention is to provide a means to facilitate the moving of an instrument or aerial camera in azimuth (horizontal plane) without touching the stabilizer of the device it supports.

Another object of this invention is to reproduce the necessary arcs of the celestial sphere upon which arcs telescopes or sighting devices are mounted and set on scales to represent the relationship of two or more celestial bodies as these bodies will appear on the celestial sphere for a given date and time.

Another object of this invention is to provide a simple means to facilitate slow movement of the sighting devices while training them in simultaneous alignment with celestial bodies in the sky.

Another object of this invention is to record the movement of the instrument in azimuth (horizontal plane) and around a zenith point in the sky (imaginary), during the time of observation by the operator.

Another object of this invention is to attach the entire unit to the aircraft or ship so as to have a reference of the heading of the craft.

Another object of this invention is to provide an optical arrangement whereby the observer may sight two celestial bodies or objects at wide angles from each other at the same time.

Another object of this invention is to provide references in the sighting units of the instrument which enable the operator to know which arc has been moved.

A further object of the invention is the provision of a celestial observation instrument having scales and sighting units, wherein the sighting units may be pre-set on the scales for a definite location on a course being travelled over the earth's surface to enable an observer to view the reference or position of the units at five seconds prior, and five seconds after, the time for the position set on the scales, from which period of ten seconds the observer may obtain a record of the movement in azimuth and around a zenith point, and from inspection of the information of the record, may obtain his location in distance and direction away from the position noted on his chart, for a given time as set on the scales of the instrument, if the image of the celestial body observed is not in the center of the target reference of the instrument.

Another object of this invention is to provide an instrument suitable for observation of high altitude stars and planets during day time, the instrument being so constructed that two stars will be within the field of the telescopes when the telescopes are properly set.

Another object of this invention is to provide an instrument to determine the orientation of the celestial sphere from pole to pole, and to define this orientation in terms which will correspond to latitude and longitude.

A still further object of the present invention is the production of a celestial observation instrument having arcs provided with scales upon which information obtained from the nautical or air almanacs is carried and wherein the sighting units are selectively and properly set after the instrument is properly mounted in an aircraft or ship's charthouse with reference to the plane's or ship's heading reference, to give to an observer the relationship as to distance between two observed bodies as represented by the respective positions of the sighting units upon the arcs.

Another object of this invention is to produce an instrument having a gravity controlled leveling reference with scales in minutes of arc, the scales being adapted to be moved from the center (representing zenith) to a position obtained from the Coriolis Acceleration correction tables in the Air Almanac published by the U. S. Naval Observatory, to automatically compensate for the error at the latitude where the plane is in flight and the speed and direction it is traveling over the earth's surface.

Another object of this invention is the production of a simple and efficient means for simultaneously measuring the angles of the rays of light from two celestial bodies or objects with respect to the position of an observer and simultaneously recording the motion between the instrument and the aircraft or ship upon which the instrument is mounted.

Other objects and advantages of the present invention will appear throughout the following specification and claims.

This application is a continuation in part of my application relating to a Celestial Observation Instrument, Serial Number 617,636, filed September 20, 1945, and now abandoned.

In the drawings:

Figure 1 is a side elevational view of the instrument with the telescope supporting arcs in a substantially vertical position;

Figure 2 is a top plan view of the instrument with the telescope supporting arcs at diverging angles;

Figure 3 is a central vertical sectional view taken at right-angles to Figure 1;

Figure 4 is an irregular horizontal sectional view taken on line 4—4 of Figure 3;

Figure 5 is a side elevational view, partly in section, of one type of telescope or sighting unit;

Figure 5ª is a sectional view of a modified form of the viewing mirror which may replace the mirror shown in Figure 5;

Figure 6 is an end view of one of the telescopes or sighting units such as is shown in Figure 5;

Figure 7 is a fragmentary sectional view of the float;

Figure 8 is a vertical sectional view of a modified form of one of the slides which supports one of the telescopes, certain parts being shown in elevation;

Figure 9 is a fragmentary top plan view of the structure shown in Figure 8, certain parts being shown in section;

Figure 10 is a vertical sectional view partly in section of a modified form of sighting unit;

Figure 11 is a top plan view of the sighting unit shown in Figure 10;

Figure 12 is a horizontal sectional view taken on line 12—12 of Figure 10;

Figure 13 is a side elevational view, partly in section, of the Polaris telescope;

Figure 14 is a side elevational view of the Polaris telescope showing the index and scale therefor;

Figure 15 is a front view of the primary section of the cam of the Polaris telescope;

Figure 16 is an end elevational view of the Polaris telescope in one position, the eye-piece being broken away;

Figure 17 is an end elevational view of the Polaris telescope in an adjusted position, the eye-piece being broken away;

Figure 18 is a fragmentary bottom plan view of the Polaris telescope showing the sections of the cam separated;

Figure 19 is a fragmentary top plan view of the Polaris telescope showing the sections of the cam separated.

By referring to the drawings in detail, it will be seen that 15 designates the base which is fixed to a suitable support such as a ship, aircraft, and the like, or the base 15 may be mounted upon a conventional support which is adjustable as to tilt, if desired. The base 15 supports a shallow bowl-like body 16 having a concavo-convex outer wall 17 and a similar inner or inwardly spaced wall 18 defining an outer liquid containing compartment 19 and an inner balancing and recording compartment 20. The body and base preferably are moulded of one-piece transparent plastic material.

A band 21 is fitted around the outer wall 17 of the body 16, and is movable in azimuth around the body 16. This band 21 carries diametrically spaced vertically extending plates 21a having maximum magnetic attracting characteristics such as soft iron, or the like.

The compartment 19 contains a suitable quantity of mercury 19a or other vibration dampening material, such as oil or the like. The body 16, when not in use, may be covered at its open upper end by a suitable removable cap or cover 22, a part of which is shown in Figure 1, to prevent the mercury or other liquid from spilling out of the compartment 19 when the superstructure is removed and the instrument is not in use. The cover or cap 22 is adapted to completely cover the body 16. The base 15 may be mounted upon conventional gimbals 14, as is shown in Figure 1.

When in use, a circular or other type float 23 is placed within the compartment 19 to rest upon the liquid or mercury 19a, as shown in Figure 3, to support the float 23. The float carries a plurality of bearings 24 suitably located to contact the inner face of the wall 17 to eliminate friction. The float 23 is hollow and preferably contains a colored liquid 25, light as to weight. A diaphragm 26 closes the bottom of the float 23, and a plurality of vertical tubes 26a properly vented, are carried by the float 23. These tubes 26a communicate with the interior of the float so that the liquid 25 will rise or fall in the respective tubes as the float 23 tilts. The tubes 26a are suitably graduated as at 27—see Figure 7—to indicate the off-balance position of the float 23. The colored liquid facilitates the reading of the position of the liquid within the tube or tubes 26a. The float 23 is spaced from the wall 18 as well as from the wall 17.

The float 23 is graduated 360° near its periphery, at 23a, and carries a suitable permanent magnet or preferably a plurality of magnets such as the two magnets 28, to match the number of plates 21a which are carried by the band 21. The magnets 28 in conjunction with the plates 21a, permit the rotation of the float 23 as the band 21 is rotated by the observer, but tend to retain the float in its normal position. The magnetic flux between the plates 21a and the magnets 28 constitutes an invisible connection between the float 23 and the band 21, and causes the float 23 to rotate in unison with the band 21. The band 21 is transparent and an index arrow 29 is carried by the outer face of the wall 17 near its upper edge, so that the position of the scale 23a of the float 23 in azimuth may be read with respect to this index 29, which index 29 designates the "Ship's Heading." Since the wall 17 is transparent, the degrees on the float 23 may be easily read by the observer through the wall 17 to determine the position of the float in degrees in azimuth relative to the index 29, the ship's heading, and to determine the relative bearing of the true north to the ship's heading.

The float 23 carries a plurality of upwardly extending arms 30 which support gimbal rings 31 of the conventional type which are commonly used to obtain a universal movement.

A carriage cradle 32 is suspended from the inner ring of the gimbal rings 31 by means of arms 32a. A pendulum or weight 33 is suspended from the cradle 32, and carries a pivoted stylus 34 at its lower end which may be swung into and out of an operative position to mark or record the position of the pendulum 33 upon the zenith recording chart 35, carried within the compartment 20 below the pendulum 33. An azimuth indicating arm 36 is carried by the pendulum 33 intermediate its ends and extends at right-angles to the pendulum 33. The arm 36 carries a pivoted stylus 37 of suitable marking material, and which may be swung into and out of an operative position, for marking on the inner face of the wall 18 to indicate the amount of motion of the instrument during the time of observation. A suitable counter-balance weight 38 is carried by the pendulum 33. A graduated arm 39 extends at right-angles to the pendulum 33 and an adjustable weight 40 is slidable upon the arm 39 to counteract the effect of Coriolis. Coriolis is defined as the acceleration due to the rate of change in the straight line and due to the curvature of the earth in rotation under (for example) the moving ship. This acceleration is a function of the latitude in which the ship is located and the speed at which the ship is moving. The effect of Coriolis is to tilt the level or mercury by a definite amount normal to the ship's heading. This amount can be found and tabulated in a table found in the Air Almanac published by the Naval Observatory, and having as arguments, the latitude, and the speed of the ship.

Suitable level references 41 and 42, of a type as disclosed in my Patent No. 2,557,654, issued June 19, 1951, relating to a Direction Inclination Indicator, are preferably carried by the gimbal rings 31.

A latitude arc 43 graduated 90° north and 90° south latitude is slidably mounted within the cradle 32. At the zero point at opposite ends of the arc 43 are fixed inwardly extending bearing shafts 44 and 45. The arc 43, during observation, normally extends due north and south and the shafts 44 and 45 represent the axes of the earth. The cradle 32 is provided with index lines 46 and 47, 180° apart, extending in line with the geometric center of the instrument.

At the 90° point on the latitude arc 43 and extending at right-angles thereto, a second cradle 48 is mounted and secured to the latitude arc 43 by means of a stud 50. A local hour angle arc 49, graduated from zero at its center to 90° toward either end, is slidably mounted in the cradle 48. A declination arc 51 is pivoted at the poles on shafts 44 and 45 which extend at right-angles to the latitude arc 43. This arc 51 is graduated starting at zero in the center, the celestial equator, to 90° toward each pole or the shafts 44 and 45. The declination arc 51 is connected to one end of the hour angle arc 49 at its zero point intermediate the ends of the arc 51. A movable slide 52 carrying a suitable sighting device 53, telescope, etc., is slidably mounted in any desired manner upon the declination arc 51, to be moved and set in a selected position within the radius of the arc 51, to represent the declination of a selected celestial body as listed in the Nautical Almanac for a given date and time.

A sidereal hour angle difference arc 54 is slidably mounted within the local hour angle arc 49, which is carried by the cradle 48 and is adjustable circumferentially around the axes of the shafts 44 and 45, as will be obvious by considering Figure 3. This arc 54 is graduated from zero to about 160°, more or less, toward each end for measuring the sidereal hour angle difference between two celestial bodies with reference to the sidereal hour angle measurement printed in the Nautical Almanac, relating to the selected celestial bodies to be observed.

A second declination arc 55 similar to the arc 51, also is pivoted on the shafts or poles 44 and 45, as shown in Figure 1. This arc 55 is graduated from zero at its center, the celestial equator, to 90° toward each end or pole. A movable slide 56 carrying a suitable sighting device 57, telescope, etc., is slidably mounted in any desired manner upon the second declination arc 55. This slide may be moved and set in a selected position within the radius of the arc 55, to indicate the declination of the celestial body which is obtained from the Nautical Almanac.

As shown in Figures 5 and 6 the sighting device 53 is adjustable in the conventional manner, and is mounted so that its longitudinal axis radiates from the central axis of the instrument. An arm 58 is adjustable longitudinally of the telescope 53 and carries at one end thereof a universally mounted mirror 59 to reflect an image of a celestial body, the rays of light from which pass through the telescope 53. The telescope 57 is similar to the telescope 53, and carries a universally mounted mirror 60 similar to the mirror 59. The telescope 57 is mounted upon the arc 55 so that the longitudinal axis of the arc radiates from the central axis of the instrument in a similar manner to that described with respect to the telescope 53. If desired, the mirror may be convex in cross-section as shown at 59a, to increase the viewing angle thereof and permit images from both sighting devices 53a and 57a to be reflected from one mirror, if desired.

The mounting of the telescopes 53 and 57, as shown, permits an observer to bring the images of two celestial bodies within the limited range of vision of an observer so that the images may be simultaneously and conveniently viewed although the actual celestial bodies are at a great angular distance from each other. When two selected celestial bodies are in columnation with respective telescopes, and the instrument is in a mean level position, the reading on the scales are as follows:

(1) Latitude scale 43 will give the observer's latitude, for instance, latitude 40° north;

(2) The azimuth scale 23a on the float opposite the ship's heading reference 29 indicates the ship's heading at the time of observation, e. g., 90°;

(3) The local hour angle on local angle arc 49 indicates the local hour angle measurement of the slide 51 and the telescope 53, to give the local hour angle east or west of the observer's meridian, of the observed body. Should the observed body be east of the observer's meridian, the reading on the scale is added to the Greenwich hour angle of the celestial body given in the Nautical Almanac for the date and time of observation. The answer is the observer's longitude. If the observed body is west of the observer's meridian the reading on the local hour angle scale 49 is subtracted from the Almanac date for the time and date of observation to give the observer's longitude.

For instance, when the reading 45° E. on the scale and the Almanac date shows the Greenwich hour angle as 30° for time of observation the longitude would be 75°.

The one measurement of the local hour angle is all that is necessary to obtain the longitude of the observer. It should be noted that when making the observation the relative angles of the declination arcs are fixed by means of the set screw 61 to lock these arcs together.

To align the celestial bodies, the observer slides the latitude arc 43 in the cradle 32, which is always a north and south motion, to bring both bodies within the range of the respective telescopes. The movement of the local hour angle 49, which is an east and west movement, in conjunction with the rotatable movement of the band 16 in a substantially horizontal plane resulting in the rotation of the float 23 will bring the telescopes 53 and 57 into columnation with the selected bodies. The images of these bodies will be reflected on the mirrors 45 and 60. Before making observation, the instrument is balanced in a level position. In order to obtain a record of the motions taking place during the period of observation, the observer moves the two styluses 34 and 37 to an operative position, which styluses may be swung into and out of an operative position because of their pivotal mounting as shown. The movement in azimuth is recorded on the inner face of the wall 18, to indicate the relative movement between the heading of the airplane or ship and the north point on the instrument. The angular movement with reference to zenith is recorded by the stylus 34 on the chart 35.

The mercury 19a supports the measuring elements of the instrument in floating relation with respect to the body 16, and the mercury dampens vibration caused by the ship or plane upon which the instrument is mounted.

It is a known fact that stars are visible by use of a high-powered telescope, such as is used in the present instance, close to zenith during daylight. This invention provides means for training the telescope to the known position of the star at a given time and date, and also provides means to eliminate vibration from the instrument. This invention, therefore, may be efficiently used for observing navigational stars during daylight from an airplane, ship, and the like, or from an unstable platform, due to the mercury supported float and associated mechanism.

In Figures 10 to 12, there is shown a modified form of sighting device which comprises a pair of aligned reticles 65 and 66 having sight registering cross wires 67 and 68 of the conventional type. These reticles are mounted in a housing 69, which housing fits through the slotted supporting arc, such as the declination arcs 51 and 55. The housing 69 carries a depending arm 70 having an adjustable end extension 71. A mirror 72 is carried by the lower end of the extension 71 and is pivotally mounted so as to swing in two-right-angular directions. The mirror comprises an outer band pivoted, as at 73, to the extension 71, and an inner band carrying the reflected surface pivoted within the outer band at right-angles to the pivot 73.

As shown in Figures 8 and 9, the sighting device 74, similar to the sighting device 56, is slidably mounted upon the declination arc 75 by means of a housing 76. A vernier 77 is carried by the housing 76 for meshing engagement with suitable teeth 75a carried by the arc 75. It should be understood that a vernier may be used for adjustment of any of the arcs of the instrument within the spirit of the invention, and since verniers are commonly used for such adjustments, it is thought unnecessary to illustrate and describe in detail such vernier connections. The mounting of a vernier to provide adjustment is well within the skill of any mechanic when building such instruments.

In conjunction with the instrument above described, an auxiliary Polaris (North Star) telescope 78 is detachably secured to north end of the latitude arc 43 in line with the pole or shaft 45, as is shown in Figure 1. This telescope 78 is supported by a suitable bracket 79, which is detachably secured to the latitude arc 43 as above described. The telescope 78 rotates on an axis in line with the polar axis of the instrument, that is, the axis of the shaft 45.

As is shown in Figures 13, 14 and 15, the bracket 79 carries a journal bolt 80 which constitutes the axis of the shaft 45, upon which is rotatably mounted the primary section 81 of an adjustment cam 82. An auxiliary section 83 of the adjustment cam 82 is also rotatably mounted upon the journal bolt 80. The section 81 is provided with a plurality of sockets 84 arranged in an encircling path around the bolt 80. A spring-pressed ball 85 is carried by the auxiliary section 83 and normally engages one selected socket 84 in the primary section 81. This spring-pressed ball and the sockets provide a releasable latching means upon the meeting faces of the cams to detachably hold the auxiliary section 83 in a selected rotated position with respect to the cam section 81. An index 85a is carried by one section of the cam for registration with the scale 86 which is carried by the companion section of the cam to indicate the position of Polaris in its changing local hour angle around the true celestial pole according to the observer's location on the earth. The Polaris correction tables in the Nautical Almanac give the minutes of arc variation necessary to correct the daily change of position of Polaris around the true celestial pole. For correcting an observation of the star Polaris to determine the observer's latitude on the earth and the true celestial north point, the section 83 is rotated to the proper position upon the section 81 to change the angular position of the telescope 87 and to make the necessary correction as provided in the table found in the Nautical Almanac. This celestial north point is absolutely necessary for correcting compasses and establishing geographic surveys on the earth's surface. A right-angular telescopic element 87 of a conventional type is fixed to the cam section 83 and is rotatable with the cam section 83 after being corrected mechanically to take care of the variance in minutes of arc relative to Polaris and the true celestial pole. The telescopic element 87 is provided with a reticle 88 and the telescopic element 87 may be rotated with both cam sections 360° around the line of sight.

The use of the Polaris telescope:

*Example.*—Polaris appears from observer to rotate 1° off center from the true celestial pole. The correction for this rotating motion is listed in Nautical Almanac issued by the Naval Observatory. By rotating the cam section 83 to bring the index Polaris into registration with point 9 P. M. on the scale—see Figure 18—located on cam section 82 which is the position of Polaris at the time of sight, in reference to the true celestial pole, the angle of tilt of the telescope 87 with this setting automatically gives the true latitude and true north point on the latitude arc 43 and the azimuth scale 23a with reference to the ship's or plane's heading 29 when the instrument is level and the reticle of the telescope 87 is in registration with Polaris.

The operation of this device eliminates calculations to determine the observer's latitude and the true heading of the ship or plane as is now necessary with instruments now in use. Up to this time mathematical calculation, using information obtained from the Nautical Almanac published by the Naval Observatory, has been necessary to make these corrections. By means of the present device, the corrections are made mechanically by changing the incline of the telescope 87 to match the 1° off center position of Polaris relative to the true celestial north and the observer's latitude with respect to the earth. The cam section 83 may be rotated relative to the cam section 82 to periodically change the angular tilt of the telescope 87 with reference to the continuous change in geographic position of the instrument upon which the Polaris telescope is carried. Any means may be provided for this rotation, manual or otherwise.

Through the medium of the arcs 51 and 55, and the sighting devices 53 and 57, a means is provided for setting two sighting devices on arcs representing the celestial sphere and matching the rays of light from two stars, through the sighting devices after the settings have been made, to thereby measure an observer's latitude, the relative bearing of the ship's heading to true north, and the local hour angle of one of the stars which is matched.

Having described the invention, what I claim as new is:

1. An instrument of the class described comprising a base, a pair of sighting devices, measuring means for measuring the angular positions of said sighting devices relative to said base and relative to each other, and said sighting devices being adjustably mounted relative to said base and to each other to bring the images of two celestial bodies simultaneously within the range of vision of an observer to establish the geographic location of an observer by consulting said measuring means and by comparing the measurements with data in the Nautical Almanac giving the positions of these two bodies in the celestial sphere at the date and time of observation, said measuring means having a polar axis, and a Polaris telescope mounted at said polar axis for observing Polaris from said instrument to determine its position with respect to an observer.

2. An instrument of the class described comprising a base, a bowl-like body carried by the base, said body having a liquid-containing compartment, a float in said compartment, gimbal rings mounted upon said float, a float adjusting means carried by the body and rotatable about the central axis of the body, co-acting magnetic means carried by said float and said float-adjusting means and providing an invisible connection therebetween to facilitate the rotative adjustment of the float as the float-adjusting means is moved circumferentially of the body, means carried by the gimbal rings for measuring the angle of the ray of light from a celestial body with respect to said instrument, said body having a recording compartment inwardly of the liquid containing compartment, a pendulum hung from said gimbal rings, and recording means carried by said recording compartment and pendulum for recording the position of the means for measuring the angle of a ray of light with respect to zenith at the time of observation.

3. An instrument of the class described comprising a base, a bowl-like body carried by the base, said body having a liquid-containing compartment, a float in said compartment, gimbal rings mounted upon said float, a float adjusting means carried by the body and rotatable about the central axis of the body, co-acting magnetic means carried by said float and said float-adjusting means and providing an invisible connection therebetween to facilitate the rotative adjustment of the float as the float-adjusting means is moved circumferentially of the body, means carried by the gimbal rings for measuring the angle of the ray of light from a celestial body with respect to said instrument, said body having a recording compartment inwardly of the liquid-containing compartment, a pendulum hung from said gimbal rings, recording means carried by said recording compartment and pendulum for recording the position of the means for measuring the angle of a ray of light with respect to zenith at the time of observation, said recording means comprising a chart carried by the recording compartment, and a stylus carried by the pendulum.

4. An instrument of the class described comprising a base, a bowl-like body carried by the base, said body having a liquid-containing compartment, a float in said compartment, gimbal rings mounted upon said float, a float adjusting means carried by the body and rotatable about the central axis of the body, co-acting magnetic means carried by said float and said float-adjusting means and providing an invisible connection therebetween to facilitate the rotative adjustment of the float as the float-adjusting means is moved circumferentially of the body, means carried by the gimbal rings for measuring the angle of the ray of light from a celestial body with respect to said instrument, said body having a recording compartment inwardly of the liquid-containing compartment, a pendulum hung from said gimbal rings, recording means carried by said recording compartment and pendulum for recording the position of the means for measuring the angle of a ray of light with respect to zenith at the time of observation, and an azimuth position recording means carried by said pendulum.

5. An instrument of the class described comprising a base, a bowl-like body carried by the base, said body having a liquid-containing compartment, a float in said compartment, gimbal rings mounted upon said float, a float adjusting means carried by the body and rotatable about the central axis of the body, co-acting magnetic means carried by said float and said float-adjusting means and providing an invisible connection therebetween to facilitate the rotative adjustment of the float as the float-adjusting means is moved circumferentially of the body, means carried by the gimbal rings for measuring the angle of the ray of light from a celestial body with respect to said instrument, said body having a recording compartment inwardly of the liquid-containing compartment, a pendulum hung from said gimbal rings, recording means carried by said recording compartment and pendulum for recording the position of the means for measuring the angle of a ray of light with respect to zenith at the time of observation, an azimuth position recording means carried by said pendulum, and a weighted Coriolis correction means carried by said pendulum.

6. An instrument of the class described comprising a base, a bowl-like body carried by the base, said body having a mercury-containing compartment, mercury in said compartment, a float in said compartment, gimbal rings mounted upon said float, a float adjusting means carried by the body and rotatable about the central axis of the body, co-acting magnetic means carried by said float and said float-adjusting means and providing an invisible connection therebetween to facilitate the rotative adjustment of the float as the float-adjusting means is moved circumferentially of the body, means carried by the gimbal rings for measuring the angle of the ray of light from a celestial body with respect to said instrument, a diaphragm formed in the bottom of said float, a liquid in said float, and means carried by said float to register the position of said liquid in said float to indicate the angle of tilt of said float with respect to a level position.

7. In combination with an observation instrument having a latitude arc and a plurality of declination arcs journalled on the Polaris axis of said latitude arc, sighting devices carried by said declination arcs for sighting celestial objects to determine the positions of said objects, and a Polaris telescope rotatably mounted upon said polar axis for observing Polaris from said instrument and determining its position with respect to an observer.

8. An instrument of the class described comprising a support, a latitude arc mounted upon said base and adapted to be aligned with the polar axis, a journal carried by said latitude arc adapted to extend in line with the polar axis, a telescope comprising a sighting element rotatably mounted upon said journal for alignment with the polar axis, and means for changing the angular position of the sighting element relative to the polar axis to follow the daily eccentric path of Polaris around the true celestial pole.

9. An instrument of the class described comprising a support, a latitude arc mounted upon said base and adapted to be aligned with the polar axis, a journal carried by said latitude arc adapted to extend in line with the polar axis, a telescope comprising a sighting element rotatably mounted upon said journal for alignment with the polar axis, means for changing the angular position of the sighting element relative to the polar axis to follow the daily eccentric path of Polaris around the true celestial pole, said telescope comprising a pair of cam sections supporting the telescope, and means for locking the cam sections in relative adjusted relation.

10. An instrument of the class described comprising a support, a latitude arc mounted upon said base and adapted to be aligned with the polar axis, a journal carried by said latitude arc adapted to extend in line with the polar axis, a telescope comprising a sighting element rotatably mounted upon said journal for alignment with the polar axis, means for changing the angular position of the sighting element relative to the polar axis to follow the daily eccentric path of Polaris around the true celestial pole, said telescope comprising a pair of cam sections supporting the telescope, means for locking the cam sections in relative adjusted relation, and indicating means on the cam sections to indicate the adjusted position of the sections and the telescope carried thereby.

11. An instrument of the class described comprising a hollow base having a float receiving chamber, a compartment on said base within said chamber, a fluent material between the walls of said chamber and said compartment, a float supported by said material, means supported upon said float for measuring the position of celestial objects relative to an observer, and means suspended below said first mentioned means and positioned within said compartment for compensating for the force of Coriolis.

12. An instrument of the class described comprising a hollow base having a float receiving chamber, a compartment on said base within said chamber, a fluent material between the walls of said chamber and said compartment, a float supported by said material, means supported upon said float for measuring the position of celestial objects relative to an observer, and means suspended below said first mentioned means and positioned within said compartment for counterbalancing the entire instrument.

13. An instrument of the class described comprising a hollow base having a float receiving chamber, a compartment on said base within said chamber, a fluent material between the walls of said chamber and said compartment, a float supported by said material, means supported upon said float for measuring the position of celestial objects relative to an observer, and means suspended below said first mentioned means and positioned within said compartment for recording an azimuth reading.

14. An instrument of the class described comprising a hollow base having a float receiving chamber, a compartment on said base within said chamber, a fluent material between the walls of said chamber and said compartment, a float supported by said material, means supported upon said float for measuring the position of celestial objects relative to an observer, and means suspended below said first mentioned means and positioned within said compartment for recording an azimuth reference.

15. An instrument of the class described comprising a base having an outer fluid containing compartment and an inner compartment within said outer compartment, fluid contained between the walls of said outer compartment and said inner compartment, measuring means supported upon said fluid in said fluid containing compartment for measuring the positions of celestial objects relative to an observer, and a pendulum connected to and suspended below said measuring means and extending into said inner compartment of said base for free unobstructed swinging movement of said pendulum in a manner whereby said measuring means will be sensitive to the movement of said fluid in said outer compartment.

References Cited in the file of this patent

UNITED STATES PATENTS

| 20,506 | Oakes | June 8, 1858 |
|---|---|---|
| 464,261 | Beehler | Dec. 1, 1891 |
| 538,889 | Arvidson | May 7, 1895 |
| 667,785 | Lietz | Feb. 12, 1901 |
| 686,127 | Potter | Nov. 5, 1901 |
| 2,064,062 | Hagner | Dec. 15, 1936 |
| 2,337,587 | Brocky | Dec. 28, 1943 |
| 2,403,091 | Lear | July 2, 1946 |
| 2,612,693 | Schonstedt | Oct. 7, 1952 |

FOREIGN PATENTS

| 150,125 | Great Britain | Sept. 2, 1920 |
|---|---|---|